July 21, 1959     J. REGAN ET AL     2,895,428
LOWERING PULLING TOOL AND SHATTERABLE GUIDE NOSE COMBINATION
Filed May 21, 1956     2 Sheets-Sheet 1

John Regan,
Louis M. Regan,
INVENTORS.
By Their Attorneys.
Harris, Kiech, Foster & Harris.

July 21, 1959 J. REGAN ET AL 2,895,428
LOWERING PULLING TOOL AND SHATTERABLE GUIDE NOSE COMBINATION
Filed May 21, 1956 2 Sheets-Sheet 2
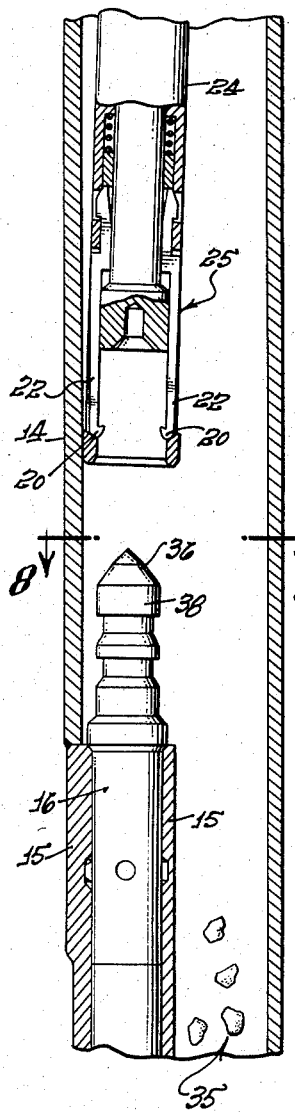
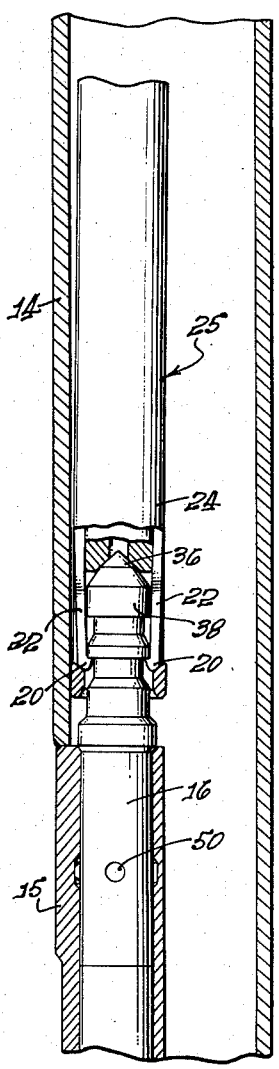
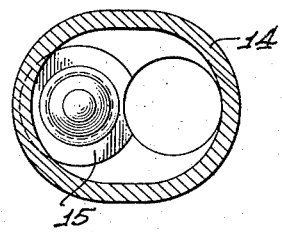
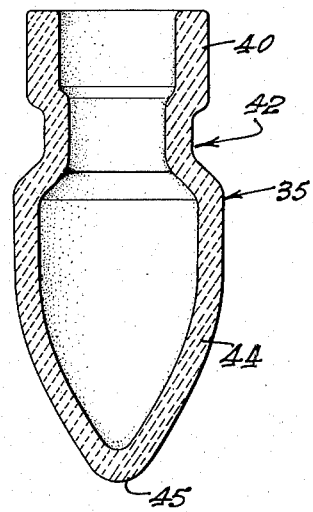
JOHN REGAN,
LOUIS M. REGAN,
INVENTORS.
BY THEIR ATTORNEYS.
HARRIS, KIECH, FOSTER & HARRIS.

United States Patent Office 2,895,428
Patented July 21, 1959

2,895,428

LOWERING PULLING TOOL AND SHATTERABLE GUIDE NOSE COMBINATION

John Regan, Rolling Hills, and Louis M. Regan, Redondo Beach, Calif., assignors to Regan Forge and Engineering Company, San Pedro, Calif., a corporation of California Application May 21, 1956, Serial No. 586,179

10 Claims. (Cl. 103—233)

This invention relates to means for retrieving from deep well tubing, such as flow tubing of oil wells, various devices carried within the tubing and previously installed at the surface, such devices being intended to be withdrawn subsequently under certain conditions.

More particularly the invention relates to means for withdrawing valves from valve housings for replacement, or pulling plugs from such valve housings for substitution of valves therein, especially in structures using, in the pipe string, a series of spaced valves, each of which valves is carried in a tubing length of special design providing an offset portion carrying a valve housing for the respective valve and into which offset portion a tool may be deflected for the purpose of withdrawal or installation of the valve.

In practice, when employing such offset tubing lengths carrying the offset valve housings, tools have been provided to be lowered into the well tubing and into offset lengths selectively, such tools having expanding deflecting means at their upper portions, such as spring-pressed "kick-over" or toggle devices, normal elongation of the tools providing for by-passing any given valve housing, such tools having retractable means for reducing the effective length thereof so that the deflected means may become operative to engage the valve or plug in a selected valve housing.

However, in the case of directional wells wherein the well bore is tipped from the vertical, when the offset in the tube section carrying a given valve housing is on the low side, the retrieving or withdrawing tool is deflected by gravity into position above the valve housing when it would otherwise by-pass the valve housing as desired in order to be selectively engaged with a valve or plug in a lower offset tubing section.

We have found that selective engagement in any condition can be assured by employing on the lower end of the pulling or retrieving tool a displaceable cap or head, such as an easily shatterable, frangible ceramic nose, which, if lowered gently into engagement with the valve or plug in the respective valve housing will slide off the top of the valve or plug so as to continue downward to a lower valve or plug assembly; or if lowered quickly so as to strike the top of the valve or plug sharply will be displaced by shattering so as to free the usual gripping jaws at the lower end of the pulling tool whereby they may drop over the upper end of the valve or plug, and latch thereon preparatory to the pulling operation. While the deflecting or "kick-over" device embodying the mentioned spring-pressed toggle means is retained in using the present improvement, the lost motion feature in the pulling tool, for effectively reducing its length to selectively engage a given valve or plug, may be omitted if desired.

It is therefore an object of the invention to provide means for use on a pulling or retrieving tool of the indicated nature which will provide for engaging or by-passing a given retrievable valve or plug and which does not require complicated manipulation, the only required manipulation being merely in varying the usual speed of lowering.

A further object of the invention is to provide a retrievable tool having a control accessory through the medium of which engagement or by-passing of a given valve or plug is easily selectively assured.

It is also an object of this invention to provide means in conjunction with a retrieving tool of the indicated nature, especially one having as a portion thereof the mentioned kick-over tool, which means will be deformable or displaceable, such as the indicated shatterable ceramic structure, which may be caused to by-pass a given valve or plug, by deflection, or may be caused to strike such valve or plug to displace such deflecting means so that the valve or plug may be engaged and withdrawn.

Other objects of the invention and various structural features thereof will become apparent to those skilled in this art upon reference to the following specification and the accompanying drawings wherein certain embodiments are illustrated.

In the drawings:

Fig. 1 is a vertical view illustrating typical well tubing in section and lowering tool means therein in elevation;

Fig. 2 is a view similar to that of Fig. 1, being an extension of Fig. 1, and illustrating an offset valve-receiving tubing section in which a valve and a retrieving tool are handled, the lower end of the tool being equipped with a control head of the improvement, Fig. 2A being a fragmentary detail;

Fig. 3 illustrates in fragmentary form a typical well head at the top of a conventional well, and a series of two offset tubing sections carrying retrievable valves of the indicated nature and a retrieving or pulling tool;

Fig. 4 is an enlarged vertical section illustrating the shattering of a control head of this invention at the location of a valve which is to be withdrawn;

Fig. 5 is a view similar to that of Fig. 4 indicating that the parts of the fractured control head are dropping away, the retrieving tool being aligned for engagement with the valve;

Fig. 6 is a view similar to that of Fig. 5 showing the valve engaged by the pulling tool;

Fig. 7 is a vertical section on an enlarged scale of one form of control head of this invention, this being a ceramic shatterable head shaped to be engaged by the gripping jaws of the pulling tool; and Fig. 8 is a cross-sectional detail taken on the line 8—8 of Fig. 5.

Referring to the drawings, Figs. 1, 2 and 3 show principally the general relationship of the parts of equipment with which the jaw-guarding and deflecting head of this invention is employed, Fig. 2A showing in slightly greater detail the mounting of the guard and deflecting head on the pulling tool; and Figs. 4, 5 and 6 further indicate the relationship between the pulling tool and the part to be pulled after the positioning or control head of this improvement has performed its function.

These figures illustrate a conventional deep-well flow tubing 10 or the like and a tool-pulling assembly 12 on a line 13 therein, the lower end of the tubing 10 being shown as carrying one or more offset tubing sections 14 carrying in their offset portions appropriate valve housings 15 and appropriate valves 16 (or plugs when valves are not desired), the upper end of each valve having annular catch flanges 18 to be eventually engaged by hooked ends or catch fingers 20 of spring dogs or jaws 22 carried at the bottom of an overshot pulling cylinder 24 on the lower end of a pulling or "fishing" tool generally indicated at 25 and including a "kick-over" tool 26 comprising a plurality of toggle links 28 urged by a coil spring 30 disposed about a shank 32 of the tool 25 for normally urging the toggle links of such "kick-over" device into expanded position in the respective enlarged offset tubing length 14 and tending to move the pulling cylinder 24 into the operative position illustrated particularly in Figs. 2 and 4. The apparatus thus described is a structure well known and extensively used in the oil fields and requires no further description.

The displaceable control head of this improvement is illustrated as a frangible ceramic head or nose 35 carried by the dogs 22 at the bottom of the pulling cylinder 24 when the pulling tool is being run into well tubing to withdraw a valve 16 or corresponding plug.

The relationship between the deflecting head or control head 35 and the pulling dogs 22 as used on the pulling cylinder 24 is disclosed in greater detail in the fragmentary showing of Fig. 2A. Here the ceramic head 35, which is shown in greater detail in Fig. 7, is a hollow device with relatively thin walls made of a very frangible fired ceramic material which is preferably glazed, and which, in conjunction with its thin walls, will shatter readily upon sharply striking a top tapered extremity 36 of the valve 16 above the catch flanges 18 to pass an upper cylindrical portion 38 above the uppermost flange 18, which portion 38 is adapted to enter the lower end of the pulling cylinder 24 and pass up between the jaws 22. The upper end of the frangible head 35 is in the form of an upstanding cylindrical collar 40 of about the same diameter as the cylindrical portion 38 of the top of the valve 16, so that such collar 40 also may pass between the jaws 22. In order to provide for positive engagement of the upper end of the head 35 by the hooked ends of the jaws 22, the head 35 is annularly recessed below the portion 40 to provide an external annular groove 42 in which the hooked ends 20 are received as seen in Fig. 2A. Below the annular recess 42, the head 35 is in the form of a somewhat enlarged bulbous portion 44 which tapers downward to a closed lower extremity 45.

Thus, when the fragile deflecting head or nose 35 is installed at the surface in the lower end of the pulling tube 24, and the entire pulling assembly 12 with the tool 25 is lowered into the tubing 10 on the wire line 13, the parts may assume the relationship seen in Fig. 2 adjacent the illustrated valve 16. If it is desired to by-pass the valve 16 and run down into a lower offset tubing length 14, gentle lowering of the deflecting head 35 on the tool 25 will permit the deflecting head 35 to slide past the tapered upper end 36 of the valve 16 and pass on down through the offset tubing length 14 to another valve-carrying length 14.

When that valve 16 has been reached which it is desired to pull, the deflection head 35 is elevated somewhat from the position of Fig. 2 and the wire line 13 is then released sufficiently for the tool 25 with the shatterable deflection head 35 to drop sharply onto the upper end 36 of the valve 16, as a consequence of which the head 35 will shatter into fragments as seen in Fig. 4, these fragments falling down through the rest of the tubing and thereby clearing the previously guarded dogs 22 and their gripping hooks or fingers 20. As a result the tool continues its descent (Fig. 5) and drops over the upper end 36 of the valve 16 until the fingers 20 snap in under one of the flanges 18, as seen in Fig. 6. The valve 16 is then withdrawn in a conventional manner by pulling up the wire line 13 and the tool assembly 12, 25, the pull being sufficient to overcome whatever retention means is employed at 50 to retain the valve 16 in the valve housing 15. Such means 50 may be a shear pin, a spring detent or the like.

From the foregoing it will be apparent that the deformable or destructible deflection head 35 may be employed as a means to deflect the pulling tool 25 past any valve 16 which is not to be pulled, and may at the same time be manipulated to displace it to free the dogs 22 so that they may pass down over the upper end 36 of the valve, along with the bottom end of the pulling cylinder 24, for engagement of the fingers 20 of the dogs 22 so that the valve may be pulled. Thus, even if the position of the parts with respect to the vertical is such that the tool 25 falls by gravity into position to engage a valve 16, the latter may nevertheless be by-passed when desired. Also the use of the present deformable or frangible head 35, by reason of its changing form, permits engagement with the valve 16, when desired, without the necessity of providing for any particular lost motion in the mechanism of the pulling tool 25, it being only necessary to rely on the changeableness of the form of the member 35.

The invention claimed is:

1. In combination: a fishing tool capable of being lowered into a well and having jaw means thereon having laterally extending teeth to engage a device to be withdrawn; and a shatterable head nose carried by said jaw means and having a laterally recessed upper portion engaged by said teeth and rounded on its lower end to be deflected by a structure to be avoided when gently lowered and shatterable by sharp lowering engagement with the device to be withdrawn, whereby to free said teeth of said jaw means for engagement with said device to be withdrawn.

2. A combination as in claim 1 wherein said shatterable nose is a fragile ceramic member.

3. In combination: a fishing tool capable of being lowered into a well and having jaw means thereon having laterally extending teeth to engage a device to be withdrawn; and a displaceable head carried by the lower end of said tool adjacent said jaw means and having a laterally recessed upper portion engaged by said teeth and normally rounded on its bottom to be deflected by a structure to be by-passed and displaceable to free said teeth of said jaw means by striking said device to be withdrawn whereby said teeth of said jaw means may engage said device to be withdrawn.

4. In combination: a fishing tool capable of being lowered into a well and having jaw means thereon having laterally extending teeth to engage a device to be withdrawn; and an expendible device carried on the lower end of said fishing tool to guard said jaw means and having a laterally recessed upper portion engaged by said teeth and having an expanded configuration for deflection by a structure to be by-passed and subject to destruction by sharp engagement with said device to be withdrawn for freeing said teeth of said jaw means to engage said device to be withdrawn.

5. In combination: well tubing means for installation in a well and having therein a plurality of spaced devices at side portions thereof in positions to be by-passed, and having engageable means adapted to be selectively engaged for withdrawal of the respective devices; a fishing tool having engaging means on its lower end adapted to engage said engageable means of said devices; and a displaceable deflecting member carried on said tool in position guarding said engaging means and having a portion adapted, when lowered gently into engagement with one of said engageable means, to be deflected by such engageable means and by-passed to a lower engageable means and adapted when lowered to strike an engageable means sharply to be displaced for engagement of said engaging means of said tool with the respective engageable means for withdrawal of the respective device.

6. A combination as in claim 5 wherein said deflecting member is rupturable.

7. A combination as in claim 5 wherein said deflecting member is of shatterable ceramic.

8. A combination as in claim 5 wherein said tool has jaw means with laterally extending teeth to engage said devices, and said displaceable member is a shatterable member having recessed portions engaged by said teeth and freeing said teeth on shattering.

9. A method for selectively recovering from a deep well pipe one of a plurality of upwardly facing, laterally offset devices carried by such pipe, including: lowering into such pipe a tool having device-engaging means and a deflecting member of changeable form guarding such engaging means; moving such deflecting member slowly to and past a device to be by-passed; lowering such deflecting member suddenly upon a device to be recovered, thereby changing the form of such deflecting member to present said engaging means; moving said engaging means into device-engaging position; and withdrawing the engaged device and tool.

10. In combination with a well tubing having side portions provided with a plurality of spaced, upwardly facing devices, and a well tool in said tubing having means to engage said devices selectively and normally deflectable laterally to operative position to engage said devices selectively, a frangible nose piece mounted on the lower end of said well tool for deflecting the tool laterally from said spaced devices into inoperative positions, said well tool being provided above said nose piece with laterally disposed teeth to engage said spaced devices selectively, said nose piece being provided adjacent its upper end with a lateral recess to be engaged by said teeth for supporting the nose piece, said teeth being freed for engagement with one of said devices upon shattering of said nose piece by striking the top of such device.

References Cited in the file of this patent
UNITED STATES PATENTS

| | | |
|---|---|---|
| 2,679,903 | McGowen et al. | June 1, 1954 |
| 2,728,599 | Moore | Dec. 27, 1955 |